United States Patent [19]
Dhyanchand

[11] Patent Number: 5,182,535
[45] Date of Patent: Jan. 26, 1993

[54] SUMMING TRANSFORMER CORE FOR STAR-DELTA INVERTER HAVING A SEPARATE SECONDARY WINDING FOR EACH PRIMARY WINDING

[76] Inventor: P. John Dhyanchand, 2721 Pelham Rd., Rockford, Ill. 61107

[21] Appl. No.: 452,348

[22] Filed: Dec. 19, 1989

[51] Int. Cl.$^5$ .............................................. H01F 33/00
[52] U.S. Cl. ...................... 336/12; 336/212; 336/215; 363/43
[58] Field of Search ................. 336/5, 10, 12, 212, 336/215, 184, 147, 144, 182, 165; 322/10; 363/154, 43, 72

[56] References Cited

U.S. PATENT DOCUMENTS

| | | |
|---|---|---|
| 2,127,232 | 8/1938 | Nichols ................................ 336/5 |
| 2,137,433 | 11/1938 | Wirz ..................................... 336/5 |
| 2,418,643 | 4/1947 | Huge .................................... 336/12 |
| 3,531,708 | 9/1970 | Kuba ..................................... 336/5 |
| 3,611,224 | 10/1971 | Becker ................................... 336/5 |
| 3,775,662 | 11/1973 | Compoly et al. . | |
| 4,274,071 | 6/1981 | Pfarre . | |
| 4,488,136 | 12/1984 | Hansen et al. ....................... 336/215 |
| 4,837,497 | 6/1989 | Leibovich .............................. 336/147 |
| 4,853,664 | 8/1989 | Asakura ................................ 336/12 |

FOREIGN PATENT DOCUMENTS

| | | | |
|---|---|---|---|
| 725313 | 1/1966 | Canada ..................................... 336/5 |
| 1285901 | 12/1962 | France ..................................... 336/5 |
| 54151424 | 6/1981 | Japan . | |
| 1-179405 | 7/1989 | Japan ...................................... 336/5 |
| 350095 | 6/1931 | United Kingdom ................... 336/5 |
| 423618 | 2/1935 | United Kingdom ................. 336/10 |
| 907338 | 10/1962 | United Kingdom ................... 336/5 |

*Primary Examiner*—Thomas J. Kozma
*Attorney, Agent, or Firm*—Marshall, O'Toole, Gerstein, Murray & Bicknell

[57] ABSTRACT

A summing transformer for a star-delta inverter having a separate secondary winding for each primary winding for use in inverting variable frequency AC power into constant frequency AC power, the transformer comprising a plurality of core sections having principal legs on which primary windings are wound and secondary legs extending between adjacent said principal legs establishing shared flux paths.

12 Claims, 3 Drawing Sheets

5,182,535

SUMMING TRANSFORMER CORE FOR STAR-DELTA INVERTER HAVING A SEPARATE SECONDARY WINDING FOR EACH PRIMARY WINDING

TECHNICAL FIELD

The present invention relates generally to a system for converting mechanical power developed by a prime mover into electrical power, and more particularly to the physical structure of a summing transformer core used in a star-delta inverter having a separate secondary winding for each primary winding.

BACKGROUND

In a power conversion system such as a variable speed, constant frequency (VSCF) power generating system, a generator converts variable speed motive power supplied by a prime mover into variable frequency AC power. The variable frequency power is rectified and provided over a DC link to a controllable inverter. The inverter, which comprises one or more subinverters and a summing transformer, is operated to produce constant frequency AC power, which is then supplied, over a load bus, to loads requiring such power. In various applications, such as an aircraft jet engine, the size and weight of the summing transformer used in such a system is extremely important.

The physical structure of a summing transformer for use in a VSCF system such as that described above must accommodate the specific electronic system that is intended to be used. One such electronic system is a star-delta system. An example of a star-delta system that may be used in an inverter in a VSCF system may be found in Compoly et al., U.S. Pat. No. 3,775,662. The star-delta system of Compoly includes a 24-step inverter comprised of four subinverters and a summing transformer, and produces a 24-step, three-phase output. Each of the four subinverters is coupled to an associated set of three primary windings, which are carried on the summing transformer. Two of these associated sets of primary windings are connected in wye (or "star") configuration. The other two sets of of primary windings are connected in delta configuration. The three-phase output is developed through magnetic linkage of each of three selected groups of primary windings with three associated series of secondary windings also carried on the transformer. Each of the selected groups of primary windings comprises four windings, one from each of the four sets of primary windings. Each of the series of secondary windings comprises four secondary windings, each one in magnetic linkage with a different one of the associated group of primary windings. The three series of secondary windings are, in turn, connected in wye configuration.

One problem faced by those skilled in the art has been to construct a transformer capable of accommodating an electrical system of the type described in Compoly while meeting the size and weight limitations critical in typical applications, such as in an aircraft jet engine.

SUMMARY OF THE INVENTION

The present invention, disclosed and claimed herein, comprises a summing transformer in which an electrical system including a set of secondary windings comprised of a secondary winding for each primary winding is utilized in a relatively small and relatively light structure.

A transformer of the present invention comprises a transformer core made of laminated iron. The core may be either a unitary shell-type core or constructed of a plurality of connected E-cores. The core is comprised of a plurality of core sections, each such core section comprising a set of three principal legs on which primary windings from one subinverter are wound. An associated secondary winding is also wound around each principal leg.

The principal legs of each core section are connected to the principal legs of other core sections by secondary legs, which also establish partially-shared flux paths through which magnetic flux induced by the primary windings can flow.

The secondary windings are connected in three series consisting of one secondary winding from each core section. The series of secondary windings are connected in wye configuration.

BRIEF DESCRIPTION OF THE DRAWINGS

Further advantages of the invention will become apparent upon a reading of the following detailed description, taken in conjunction with the accompanying drawings, in which.

DESCRIPTION OF THE PREFERRED EMBODIMENT

Figure 1:
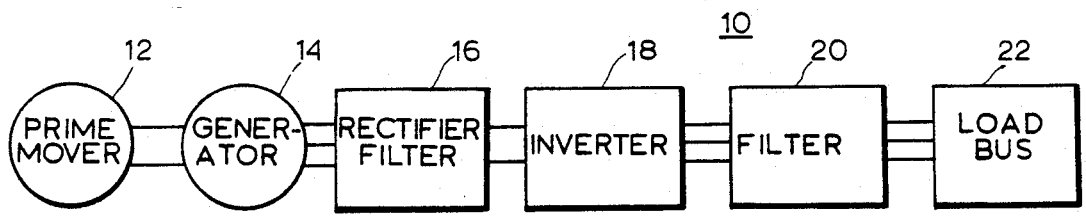
FIG. 1 shows a block diagram of a power generating system incorporating the summing transformer of the present invention.

Referring now to FIG. 1, a power conversion system 10 in the form of a variable speed, constant frequency (VSCF) system operates to convert variable speed motive power produced by a prime mover 12, such as an aircraft jet engine, into constant frequency three-phase AC electrical power that is delivered to a load bus 22.

The variable speed motive power produced by the prime mover is converted by a generator 14 into 3-phase AC power. Preferably, generator 14 is a brushless, synchronous generator, although a different generator, such as a permanent magnet generator, may also be used. The 3-phase AC power produced by generator 14 is converted by a rectifier/filter 16 into DC power.

The DC power is converted by an inverter 18 into constant frequency AC power, which is then delivered to an output filter 20 and subsequently to load bus 22.

Figure 2:
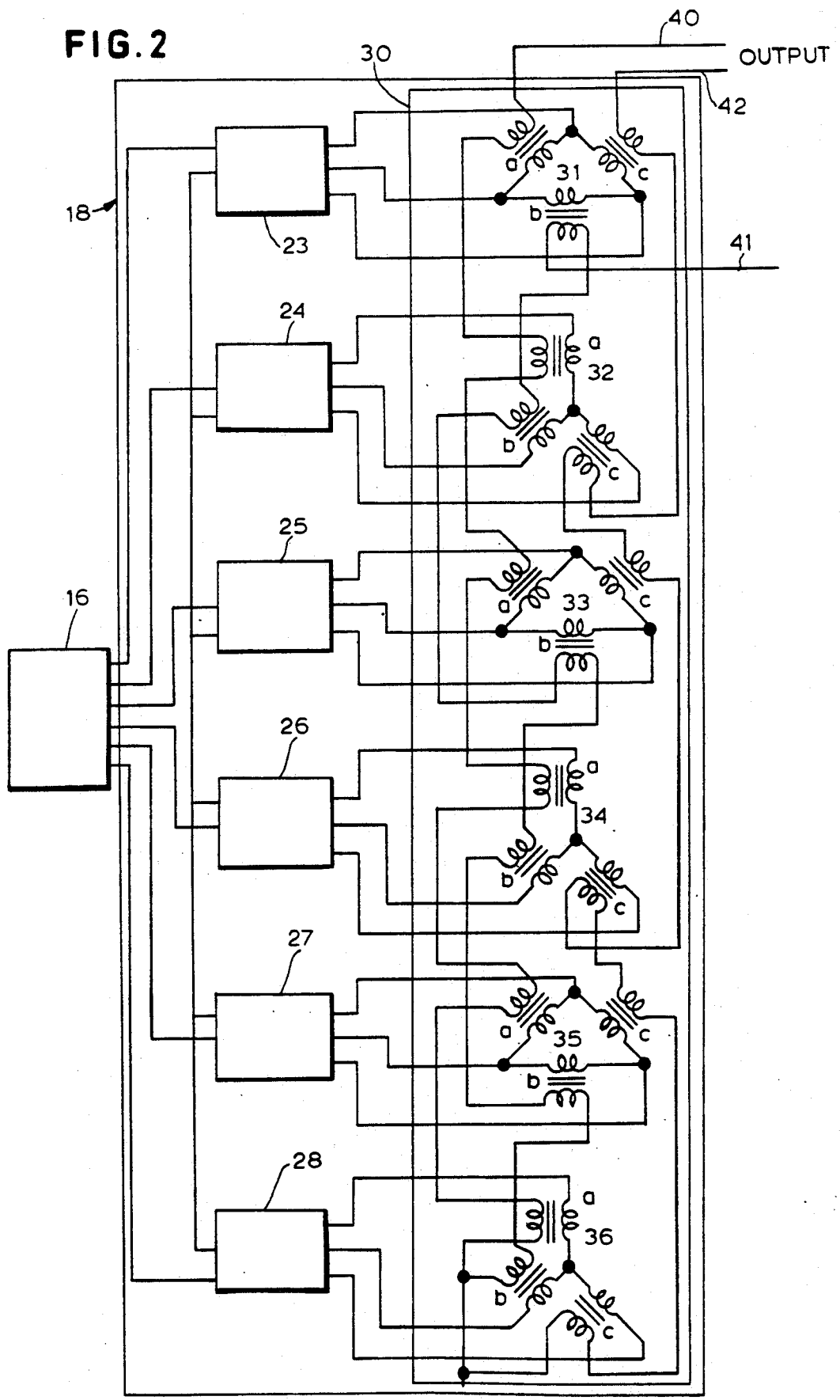
FIG. 2 shows a simplified schematic diagram of a star-delta electronic system having a secondary winding for each primary winding, as used in the inverter of the power generating system shown in FIG. 1.

As seen in FIG. 2, inverter 18 comprises six three-phase subinverters 23, 24, 25, 26, 27, and 28 and a summing transformer 30. The outputs of rectifier/filter 16 are connected to inputs of subinverters 23-28. An output of first subinverter 23 is connected to a first set of primary windings 31 of summing transformer 30. In like fashion, outputs of subinverters 24-28 are coupled to second through sixth sets of primary windings 32, 33, 34, 35, and 36, respectively. In the preferred embodiment, each of the first, third, and fifth sets of primary windings 31, 33, and 35 includes three windings 31a-c, 33a-c, and 35a-c, which are connected together in delta configuration. Each of the second, fourth, and sixth sets of primary windings 32, 34, and 36 includes three windings 32a-c, 34a-c, and 36a-c, which are connected together in wye configuration.

Each primary winding of sets 31-36 is magnetically linked with a separate secondary winding. The secondary windings are connected in three series of secondary windings 40, 41, and 42, which in turn are connected together, as a single set, in wye configuration. These series of secondary windings 40-42 are in turn coupled to output filter 20 (FIG. 1).

Figure 3:
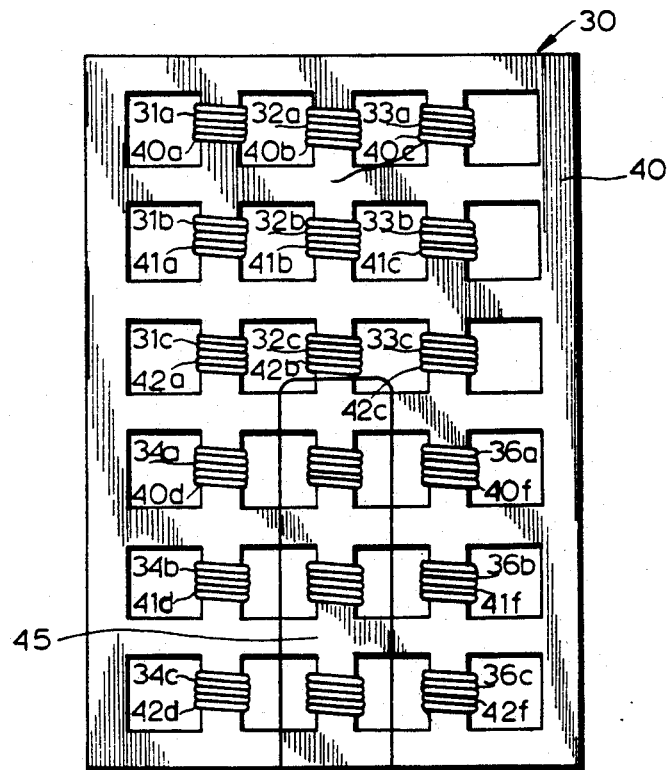
FIG. 3 shows a partial front view of the physical structure of a summing transformer that accommodates the star-delta electronic system shown in FIG. 2, including a plurality of matrix sections in accordance with the present invention.

As seen in FIG. 3, the core 40 of summing transformer 30 is a matrix of spaced legs disposed at right angles on a common plane. Primary windings 31a-c are carried on one section of the core, and each of the other sets of primary windings 32a-c, 33a-c, 34a-c, 35a-c, and 36a-c are carried on other sections of the core.

Figure 4:
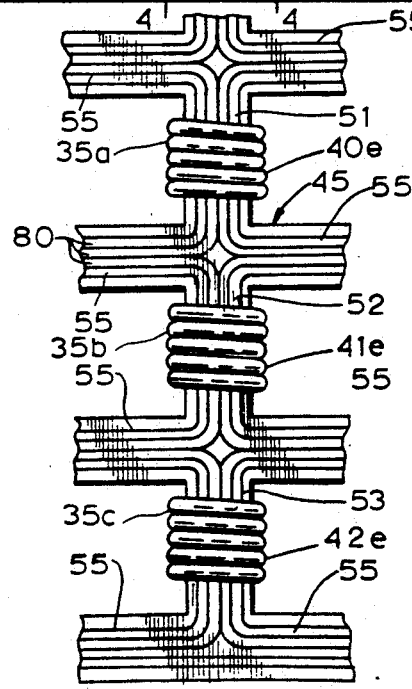
FIG. 4 shows an enlarged, detailed fragmentary front view of one of the matrix sections of the summing transformer of FIG. 3, the view being taken from the area designated 4—4 in FIG. 3.

Referring to FIG. 4, a section 45 of core 30 is illustrated in partial detail and is shown as being constructed of laminated iron. As illustrated, core section 45 comprises a plurality of legs 51-53 and 55. Three of the legs, 51, 52, and 53, are principal legs, the term "principal leg", as used herein, meaning a leg on which windings are carried. Principal leg 51 carries primary winding 35a, principal leg 52 carries primary winding 35b, and principal leg 53 carries primary winding 35c. Adjacent core sections to the left and right of core section 45, not shown in FIG. 4, comprise principal legs carrying primary windings 34a-c and 36a-c, respectively, as shown in FIG. 3. Further core sections disposed above these core sections comprise further principal legs carrying primary windings 31a-c, 32a-c, and 33a-c.

Legs 55 on core section 45 are secondary legs, the term "secondary leg", as used herein, meaning a leg that does not carry a primary winding but that extends between primary legs for establishing a continuous flux path. As seen in FIG. 4, secondary legs 55 are connected perpendicularly to the ends of principal legs 51-53, and connect primary legs on one core section with primary legs on an adjacent core section. The arrangement of the principal and secondary legs form continuous flux paths for the primary windings, allowing magnetic flux to flow when induced by current in an associated winding. For example, current flowing in primary winding 35a induces flux to move in a flux path formed by leg 51 on core section 45, a secondary leg 55 connecting said principal leg 51 with a principal leg on an adjacent core section, said principal leg on said adjacent core section, and another secondary leg 55 connecting said principal leg 51 and said principal leg on said adjacent core section. Similar flux paths are formed for each primary winding.

In the embodiment of the invention shown in FIG. 4, core 30 is illustrated as being formed by tape winding. In such an embodiment, multiple windings 80 encircle each aperture in the core.

Alternatively, core 30 can be formed of a series of laminations stacked parallel to the front surface of the core. In a core having this alternative construction, each individual lamination includes all the legs and apertures shown in FIG. 3, but is relatively thin in depth. By combining multiple laminations, a core formed by this method has a depth comparable to that of a core formed by tape winding.

Figure 5:
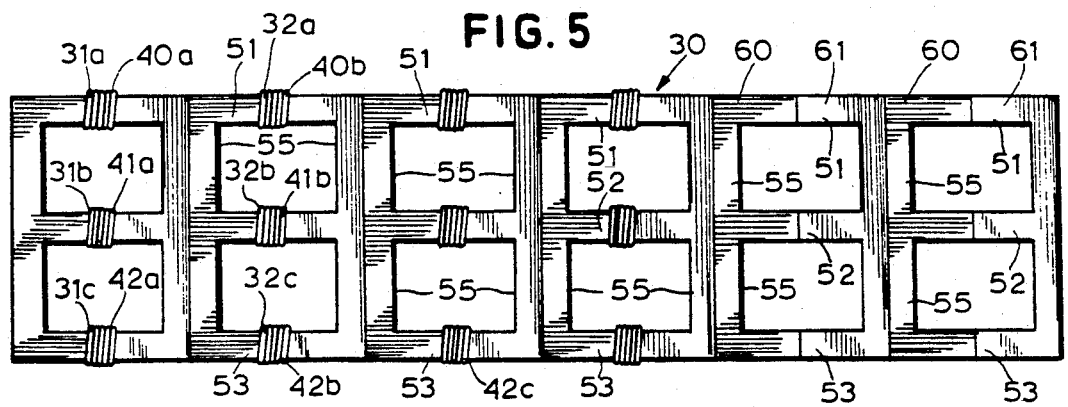
FIG. 5 shows a partial front view of an alternate embodiment of a summing transformer in accordance with the present invention wherein each matrix section is comprised of opposed E-cores.

A further alternate embodiment of core 30 is shown in FIG. 5. In that embodiment, each core section comprises two opposed E-cores 60, 61. The open ends of each E-core are connected whereby they form parallel, interrupted principal legs 51, 52, and 53, around which the primary windings are wound. Secondary legs 55 connect the spaced principal legs and establish flux paths through which magnetic flux can flow when induced by current in the primary windings. Thus, when induced by current in a primary winding carried on a principal leg 51, flux can flow through the path established by said principal leg 51, a secondary leg 55 connecting said principal leg 51 with principal leg 52 on the same core section, principal leg 52, and another secondary leg 55 connecting said two principal legs.

Figure 6:
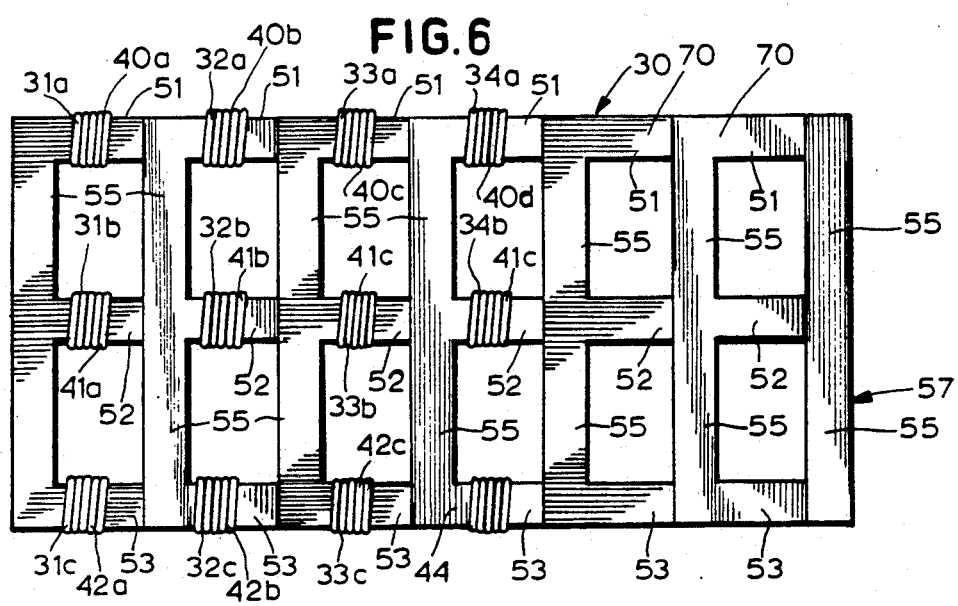
FIG. 6 shows a partial front view of another alternate embodiment of a summing transformer in accordance with the present invention wherein each matrix section is comprised of an individual E-core.

Another alternate embodiment of core 30 is shown in FIG. 6. In that embodiment, each core section comprises a single E-core 70, the arms of E-core 70 forming parallel principal legs 51, 52, and 53, around which the primary windings are wound. The open ends of each E-core 70 are abutted against the base end of an adjacent E-core. A terminal bar 57 is mounted across the open ends of the last E-core. Secondary legs 55 connect the spaced principal legs and establish flux paths through which magnetic flux can flow when induced by current in the primary windings. Thus, when induced by current in a primary winding carried on a principal leg 51, flux can flow through the path established by said principal leg 51, a secondary leg 55 on the same core section connecting said principal leg 51 with principal leg 52 on the same core section, principal leg 52, and another secondary leg 55 on an adjacent core section or on terminal bar 57 connecting said two principal legs.

In either embodiment of the core elements described above, each leg is designed so it can accommodate, without saturation, the amount of flux that will move through that leg. A leg will saturate when the flux density, which is equal to the flux divided by the cross-sectional area of the leg, exceeds the saturation flux density for the material out of which the leg is constructed. To prevent saturation, either the cross-sectional area of the leg can be increased or the leg can be constructed of a material having a higher saturation flux density.

Figure 7:
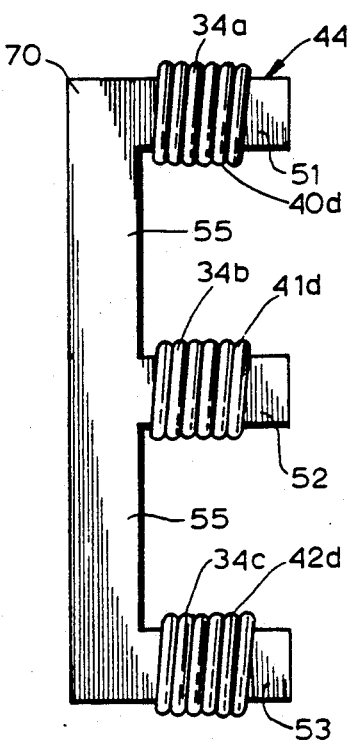
FIG. 7 shows an enlarged, detailed front view of one of the E-cores of the summing transformer of FIG. 6.

In each embodiment of the invention, a secondary winding is wound around each principal leg in magnetic connection with the primary winding that is also carried on that leg. FIG. 7 shows a detailed view of a core section 44 of the core 30 of FIG. 6. Primary windings 34a-c are carried on principal legs 51-53 respectively. Secondary winding 40d from series 40 is carried on principal leg 51 adjacent primary winding 34a. Similarly, secondary windings 41d and 42d from series 41 and 42 are carried on principal legs 52 and 53 adjacent primary windings 34b and 34c, respectively. Thus, each series of secondary windings comprises one secondary winding from each core section. As previously discussed, the series of secondary windings are connected in wye configuration, as shown in FIG. 2, with the output connected to filter 20, as shown in FIG. 1.

Although the primary and secondary windings have been shown in the drawings next to each other, to minimize leakage reactance it is beneficial to wind the secondary windings over the top of the primary windings.

It should be noted that the summing transformer of the present invention is not limited to use with a 36-step power conversion system. In fact, a 24-step inverter system that utilizes four subinverters or a system which uses a different number of subinverters may be used, if desired.

While one or more embodiments of the invention have been herein illustrated and described in detail, it will be understood that modifications and variations thereof may be effected without departing from the spirit of the invention and the scope of the appended claims.

I claim:

1. A summing transformer comprising:
   a core comprising first and second core sections, each of the core sections comprising first, second, and third principal legs;
   a first set of primary windings comprised of primary windings that are wrapped about the principal legs of the first core section, are connected to each other in wye configuration, and are not directly connected to windings from any other set of windings;
   a second set of primary windings comprised of primary windings that are wrapped about the principal legs of the second core section, are connected to each other in delta configuration, and are not directly connected to windings from any other set of windings; and
   a group of secondary windings comprised of three sets of secondary windings that are connected to each other in wye configuration and are not directly connected to windings from any other set of windings;
   the first set of secondary windings being comprised of secondary windings that are wrapped about the first principal legs of each of the core sections and are connected in series;
   the second set of secondary windings being comprised of secondary windings that are wrapped about the second principal legs of each of the core sections and are connected in series; and
   the third set of secondary windings being comprised of secondary windings that are wrapped about the third principal legs of each of the core sections and are connected in series.

2. A summing transformer as recited in claim 1, wherein:
   the principal legs together with secondary legs define apertures through which each of the primary windings and secondary windings are wound.

3. A summing transformer as recited in claim 2, wherein:
   all of the principal legs in a core section are aligned and arranged consecutively.

4. A summing transformer as recited in claim 3, wherein:
   the core is a shell core of laminated iron.

5. A summing transformer as recited in claim 3, wherein:
   the core is a tape-wound core of laminated iron.

6. A summing transformer as recited in claim 2, wherein:
   the principal legs in the first core section are spaced and arranged in parallel and the principal legs in the second core section are spaced and arranged in parallel.

7. A summing transformer as recited in claim 6, wherein:
   the core sections are comprised of opposed E-cores and the principal legs are interrupted.

8. A summing transformer as recited in claim 6, wherein:
   each of the core sections is comprised of an individual E-core.

9. A summing transformer as recited in claim 6, wherein:
   the summing transformer comprises third through sixth core sections, each with a corresponding set of primary windings wrapped about each of three principal legs.

10. A summing transformer as recited in claim 1, wherein:
    two secondary legs connect ends of principal legs between adjacent core sections, and the core has no more than four additional secondary legs.

11. A summing transformer as recited in claim 1, wherein:
    all secondary legs in the transformer have the same cross-sectional area.

12. A summing transformer as recited in claim 11, wherein:
    two secondary legs connect ends of principal legs between adjacent core sections, and the transformer has no more than four additional secondary legs.

* * * * *